United States Patent [19]
Mitsche et al.

[11] 3,983,197
[45] Sept. 28, 1976

[54] PREPARATION OF ALUMINA EXTRUDATES

[75] Inventors: Roy T. Mitsche, Island Lake; Hillard L. Kuntz, Mount Prospect; John C. Hayes, Palatine, all of Ill.

[73] Assignee: Universal Oil Products Company, Des Plaines, Ill.

[22] Filed: Sept. 24, 1973

[21] Appl. No.: 400,292

[52] U.S. Cl. .................................. 264/56; 106/65; 264/63; 264/176 R
[51] Int. Cl.² ...................... C04B 33/32; B28B 3/20
[58] Field of Search ............... 106/65; 264/63, 165, 264/176, 56

[56] References Cited
UNITED STATES PATENTS

| | | | |
|---|---|---|---|
| 2,463,979 | 3/1949 | Langrod | 264/63 |
| 3,108,888 | 10/1963 | Bugosh | 264/DIG. 19 |
| 3,274,008 | 9/1966 | Braunwarth et al. | 264/63 |

OTHER PUBLICATIONS

Luks, "How They Make $Al_2O_3$ Ceramics," *Ceramic Industry*, 67 [7], pp. 87–89, 110 (1956).

Primary Examiner—Donald J. Arnold
Assistant Examiner—John Parrish
Attorney, Agent, or Firm—James R. Hoatson, Jr.; Robert W. Welch; William H. Page, II

[57] ABSTRACT

A method of preparing alumina extrudate particles. Finely divided alumina is admixed with from about 2 to about 10 wt. % alumina hydrosol and sufficient water added thereto to produce a dough extrudable at less than about 150 psig. The mixture is then extruded, dried and calcined. The alumina hydrosol functions as a source of alumina as well as a binder and/or lubricant, and obviates the need of extraneous binders or lubricants. The method is particularly useful to produce extruded particles of low average bulk density.

4 Claims, No Drawings

PREPARATION OF ALUMINA EXTRUDATES

Alumina, including aluminum oxide in the anhydrous form as well as the various hydrated forms thereof, is extensively employed in the chemical and petroleum industries. Alumina is readily manufactured as a porous, high surface area material particularly useful as a hydrocarbon conversion catalyst, or as a support or carrier material for other components catalytically active with respect thereto. Further, the adsorbent character of alumina makes it especially useful as a dessicant, or as an adsorbent for selectively removing impurities from a process stream.

Alumina is frequently employed in a fixed bed type of operation in the form of cylindrical particles generally about 1/16 to about ⅛ inch in diameter. Such particles are typically manufactured by admixing a finely divided or powered alumina with a binder and/or lubricant and compressing the mixture into pellets by means of conventional punch and die machinery. The alumina is thus formed as hard, compact pellets of relatively high average bulk density. A far less costly alternative comprises pressuring the mixture through an orifice or perforated plate and cutting the resulting extrudate into particles of desired length.

The present invention relates to the manufacture of alumina extrudate particles. It is an object of this invention to present a novel method of manufacturing alumina extrudate particles, particularly alumina extrudate particles of relatively low average bulk density. It is a further object to present a method of manufacturing alumina extrudate particles without the use of extraneous binders and/or lubricants.

In one of its broad apects, the present invention embodies a method of preparing alumina extrudate particles which comprises forming a mixture consisting essentially of a finely divided alumina and from about 2 to about 10 wt. % alumina hydrosol, and adding sufficient water thereto to produce a dough extrudable at less than about 150 psig; extruding the resulting dough; and drying and calcining the resulting extrudate product.

Other objects and embodiments of this invention will become apparent in the following detailed specification.

The alumina hydrosol herein contemplated includes such as are prepared by the hydrolysis of a suitable acid salt of aluminum, for example aluminum chloride, and reduction of the acid anion concentration of the solution, for example, the chloride anion concentration thereof. Reduction of the acid anion concentration can be accomplished by subjecting the aluminum salt solution to electrolysis utilizing an electrolytic cell with a porous partition between the anode and cathode. In this manner, an acid anion deficiency is created in the cathode compartment whereby an olation reaction is promoted with the formation of inorganic polymers of colloidal dimension dispersed and suspended in the remaining liquid. In some cases, as in the case of aluminum acetate, where the acid anion is sufficiently volatile, the reduction in acid anion concentration can be effected simply by heating. A particularly suitable method is in the use of aluminum metal as a neutralizing agent in conjunction with, for example, an aqueous aluminum chloride solution. In this instance, the salt of neutralization is itself a hydrolyzable aluminum salt subject to polymerization and ultimate sol formation. An aluminum chloride hydrosol, variously referred to as an aluminum oxychloride hydrosol, aluminum hydroxychloride hydrosol, and the like, is a preferred alumina hydrosol for use in the method of this invention. A particularly desirable aluminum chloride hydrosol is prepared by digesting aluminum metal in hydrochloric acid at about reflex temperature — usually a temperature of from about 80° to about 105° C., and reducing the chloride anion concentration of the resulting aluminum chloride solution by the device of maintaining an excess of aluminum reactant in contact with the reaction mixture as a neutralizing agent until a hydrosol containing aluminum and chloride anion in a ratio of from about 0.9:1 to about 1.5:1 is formed. The hydrosol is preferably prepared to contain less than about 14 wt. % aluminum, generally from about 12 to about 14 wt. %.

Thus, a more limited embodiment of the present invention is in the method of preparing alumina extrudate particles which comprises forming a mixture consisting essentially of a finely divided alumina and from about 2 to about 10 wt. % aluminum chloride hydrosol and adding sufficient water thereto to produce a dough extrudable at less than about 150 psig, said hydrosol containing from about 8 to about 14 wt. % aluminum in from about a 0.9 to about a 1.5 wt. % ratio with the chloride anion content thereof; extruding the resulting dough; and drying and calcining the extrudate.

The alumina admixed with the alumina hydrosol may be any of the various aluminum oxides including aluminum oxide in the anhydrous or substantially anhydrous form, or in the form of an aluminum oxide hydrate. Thus, the alumina can be an activated alumina such as eta- and/or gamma-alumina, or an alumina precursor thereof, for example alpha-alumina monohydrate (boehmite), alpha-alumina trihydrate (gibbsite) and/or beta-alumina trihydrate (bayerite) which, upon subsequent high temperature calcination and elimination of substantially all of the water and/or hydroxyl groups commonly associated therewith, will yield the high-surface area activated form of the alumina. The alumina may be selected on the basis of its bulk density to yield extrudate product of predetermined bulk density, or aluminas of different bulk densities may be blended in any ratio to produce an extrudate product of desired bulk density. The present method is particularly adapted to the manufacture of extrudate particles of low bulk density, say less than about 0.5 grams/cc, and of relatively high strength. The alumina will preferably be an aluminum oxide hydrate, or blend of aluminum oxide hydrates characterized by a weight loss on ignition at 900°C. of less than about 30%, say from about 20 wt. % to about 30 wt. %.

Accordingly, a more specific embodiment of this invention relates to a method of preparing alumina extrudate particles which comprises forming a mixture consisting essentially of alpha-alumina monohydrate and from about 2 to about 10 wt. % alumina hydrosol and adding sufficient water thereto to produce a dough extrudable at less than about 150 psig; said hydrosol being an aluminum chloride hydrosol containing from about 8 to about 14 wt. % aluminum in from about 0.9 to about 1.5 weight ratio with the chloride anion content thereof, and said alpha-alumina monohydrate having a loss on ignition at 900° C. of from about 20 wt. % to about 30 wt. %.

After the mixture has been extruded, the extrudate particles are dried and calcined. Drying is usually effected at temperatures up to about 200° C. over a period from 1 to about 24 hours. Calcination is preferably in an oxidizing atmosphere, such as air, at a temperature of from about 350° to about 850° C., and is suitably accomplished over a 2 to 4 hour period.

The extrusion operation is suitably effected with commercial extrusion apparatus. For example, the alumina-alumina hydrosol mixture is continuously processed through a cylinder with an extrusion die at one end, the die comprising a multitude of cylindrical openings of an appropriate diameter to produce an extruded product of desired size. The mixture is continuously pressured through the die at a pressure of less than about 150 psig by means of a rotating screw, and cut into particles of desired length by means of a rotating knife.

While the present invention is directed to the preparation of alumina extrudate particles per se, the method is also advantageously employed in the preparation of alumina extrudate particles containing other catalytic components including in particular the metals of Groups IV, VIB and VIII, their oxides and their sulfides. The catalytic component, for example platinum, or a suitable precursor thereof, for example chloroplatinic acid, can be composited with the alumina starting material by impregnation and/or ion-exchange techniques prior to admixing the alumina with the alumina hydrosol in accordance with the present invention, and the mixture extruded, dried and calcined as heretofore described. Alternatively, the catalytic component, or a suitable precursor thereof, can be composited with the extruded alumina particles by impregnation and/or ion-exchange techniques, either before or after said particles have been dried and calcined. However, in the event that the catalytic component, and particularly a precursor thereof, is added to the calcined alumina extrudate particles, the resulting composite will invariably require further calcining.

The present invention provides a method of preparing pure alumina extrudate particles of low average bulk density. The alumina hydrosol acts as both a binder and a lubricant and obviates the requirement of extraneous binders and lubricants such as starch, polyvinyl alcohol, Sterotex, and the like, which must be burned from the extruded particles under controlled conditions, particularly where other catalytic components are present.

The following example is presented in illustration of the method of this invention and is not intended as an undue limitation of the generally broad scope of the invention as set out in the appended claims.

EXAMPLE 130 grams of an alpha-alumina monohydrate having a 23% weight loss on ignition at 900°C. and an average bulk density of 0.8 grams per cubic centimeter, and 137 grams of an alpha-alumina monohydrate having a 27% weight loss on ignition at 900° C. and an average bulk density of 0.2 grams per cubic centimeter, were thoroughly dry-mixed and thereafter mulled and blended with an alumina hydrosol prepared by digesting aluminum in dilute hydrochloric acid at about 102° C., sufficient aluminum being digested to yield a hydrosol containing aluminum in about a 1.4:1 weight ratio with the chloride anion content thereof. A sufficient amount of water was added to form a smooth paste and the resulting mixture was extruded under about 100 psig pressure, oven-dried and calcined for 2 hours in air at 650° C. The dried and calcined alumina extrudate particles had an average bulk density of 0.5 grams per cubic centimeter.

We claim as our invention:
1. A method of preparing alumina extrudate particles which comprises:
   a. forming a mixture consisting essentially of a finely divided alumina and from about 2 to about 10 wt. % alumina hydrosol, and adding sufficient water thereto to produce a dough extrudable at less than about 150 psig.;
   b. extruding the resulting dough; and
   c. drying and calcining the extrudate.
2. The method of claim 1 further characterized in that said alumina has a loss on ignition at 900° C. of less than about 30 wt. %.
3. The method of claim 1 further characterized in that said alumina has a loss on ignition at 900° C. of from about 20 wt. % to about 30 wt. %.
4. The method of claim 1 further characterized in that said extrudate is calcined at a temperature of from about 350° to about 850°C. in an oxidizing atmosphere.

* * * * *